May 22, 1934.    G. H. MAUS    1,959,729
RAKE
Filed Oct. 26, 1933
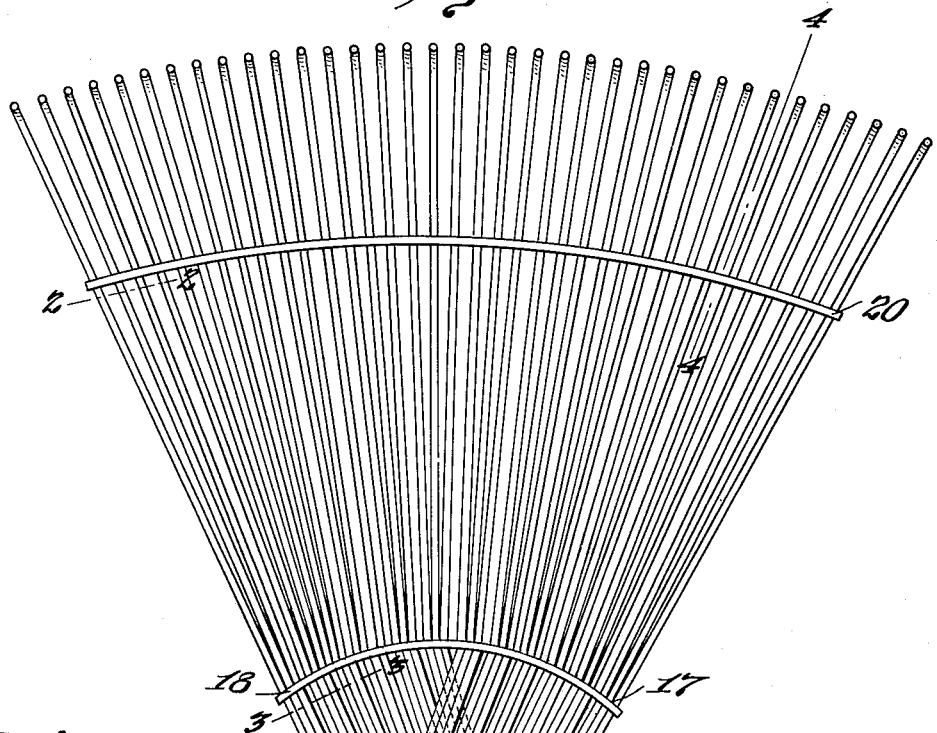
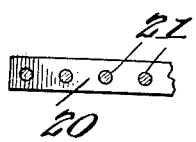
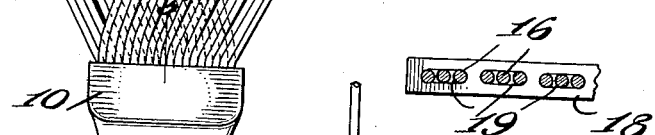
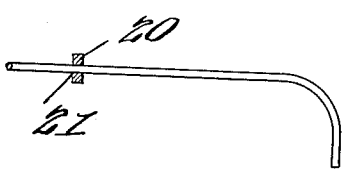
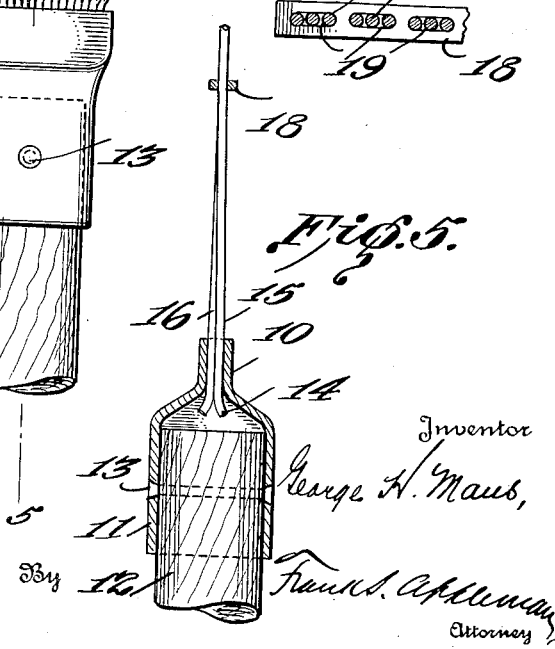

Patented May 22, 1934

1,959,729

UNITED STATES PATENT OFFICE 1,959,729

RAKE

George H. Maus, Amsterdam, N. Y., assignor to Geo. H. Maus, Inc., Amsterdam, N. Y., a corporation of New York Application October 26, 1933, Serial No. 695,363

5 Claims. (Cl. 55—10)

This invention relates to rakes, and particularly to a type which has long diverging metal tines.

It is an object of this invention to provide a rake having the tines relatively close together at their outer ends with a spread of conventional degree, and it is desirable to have the inner ends nested and secured so that they occupy comparatively little space and have a strong and durable joint with a head or collar for securing the same to a handle.

It is a further object of this invention to provide a rake of the character indicated in which the tines are braced between their ends in order that their rigidity may be maintained and they will be prevented from undue movement with relation to one another. In other words, it is desirable to restrict the degree movement which might prevent the tines from separating one from the other as the rake is manipulated.

With the foregoing and other objects in view, the invention consists in the details of construction and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a plan view of a rake embodying the invention;

Figure 2 illustrates a sectional view on the line 2—2 of Fig. 1;

Figure 3 illustrates a sectional view on the line 3—3 of Fig. 1;

Figure 4 illustrates a side elevation of the outer ends of the tines with one of the braces in section; and Figure 5 illustrates a sectional view of the head of the rake showing the inner ends of the tines nested therein, on the line 5—5 of Fig. 1.

In the drawing 10 denotes the head of the rake which is produced from a tubular length of metal, preferably round in cross section, so that one end may form a socket 11 for the reception of a handle 12, which may be secured therein by a fastening 13 such as a rivet or the like.

The tines are multiplied in number, as compared with metal rakes of this character and, in order that a great number of tines may be used for the purpose heretofore stated, the inner ends of the said tines are applied to the head in layers superimposed with relation to one another and thereafter the head is compressed to form a socket in which the inner ends of the tines are compactly nested. Furthermore, in order to secure the tines to the head, an autogenous or other welding operation results in the tines and head being connected by a strong joint and, furthermore, the inner ends of the tines may be slightly bent or a hook-shape may be imparted to the inner ends, as illustrated at 14.

The tines are arranged in groups of three, the groups being slightly separated one from the other on each side of the central zone of the rake, one of such groups being identified by the numeral 15 on one edge of the rake and another group 16 being located on the other edge, and there are of course intermediate groups, as is fully shown in the drawing.

In order to utilize a great number of tines, they are caused to diverge from an approximate zone 17 toward their outer ends and to converge from said zone toward their inner ends. It is shown in the drawing that the superimposed layers of tines overlap or partially cross one another as they approach the head and preferably just beyond the outer end of the head the tines are curved or are more or less abruptly bent in order that the inner ends of said tines will lie parallel to one another and at angles to those portions which are slightly beyond the outer end of the head.

A curved brace 18 is provided with a plurality of slots 19, the slots being of such length that each will accommodate or receive a group of tines, as fully shown in Figure 3. The brace 18 is located just outside of the point or zone where the tines are superimposed with relation to one another.

Another brace 20 is provided with apertures 21, it being understood that each aperture is occupied by one of the tines. The brace 20 may be located at any convenient distance from the end and will prevent undue movement or vibration of the tines at their outer ends.

A rake made in accordance with the foregoing disclosure is of rugged construction and, owing to the joint between the tines and the head, there is little liability of the tines becoming loose in the head or being dislodged therefrom.

I claim:

1. A rake comprising layers of tines, the tines of each layer being arranged in groups, the tines of each group being in contact with one another at their inner ends and lying parallel with one another, a head into which the parallel and contiguous portions of the tines extend, said head being shaped to the contour of the nested tines, said tines being welded together and to the head, one layer of said tines having its outer ends diverging to one side of the center of the rake head, and the other layer extending diagonally to the other side past the center of the rake head.

2. A rake comprising layers of tines, the tines of each layer being arranged in groups, the tines of each group being in contact with one another at their inner ends and lying parallel with one another, a head into which the parallel and contiguous portions of the tines extend, said head being shaped to the contour of the nested tines, said tines being welded together and to the head, one layer of said tines having its outer ends diverging to one side of the center of the rake head, and the other layer extending diagonally to the other side past the center of the rake head, a reenforcing element having slots, each of which contains a group of tines and another bracing element having apertures each of which is occupied by a tine, the last mentioned bracing element being located in proximity to the outer ends of the tines.

3. In a metal rake, a head comprising a tubular member, superimposed layers of tines having their inner ends parallel to the axis of the head located in said head, the said head being deformed to contact and bind the tines therein, the said tines of each layer being arranged in groups and projecting outwardly and diagonally with relation to one another, a brace having slots to receive the several groups of tines, and a brace having apertures each of which is occupied by a tine.

4. In a metal rake, a head comprising a tubular member, superimposed layers of tines having their inner ends parallel to the axis of the head located in said head, the said head being deformed to contact and bind the tines therein, the said tines of each layer being arranged in groups and projecting outwardly and diagonally with relation to one another, and braces having apertures to receive the tines.

5. In a metal rake, a head comprising a tubular member, superimposed layers of tines having their inner ends parallel to the axis of the head located in said head, said head being deformed to contact and bind the tines therein, the said tines being welded to one another and to the head, and means for holding the outer end of the tines spaced apart.

GEORGE H. MAUS.